(12) United States Patent
Kumar

(10) Patent No.: US 8,290,892 B1
(45) Date of Patent: Oct. 16, 2012

(54) SYSTEM AND METHOD FOR PERFORMING NON-LINEAR CONSTRAINED OPTIMIZATION WITH AN AUGMENTED LAGRANGIAN PATTERN SEARCH

(75) Inventor: Rakesh Kumar, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 628 days.

(21) Appl. No.: 12/247,605

(22) Filed: Oct. 8, 2008

Related U.S. Application Data

(63) Continuation of application No. 11/302,743, filed on Dec. 13, 2005, now abandoned.

(51) Int. Cl.
G06F 17/00 (2006.01)
G06N 7/04 (2006.01)

(52) U.S. Cl. .......................................................... 706/54
(58) Field of Classification Search ..................... 706/19
See application file for complete search history.

(56) References Cited

U.S. PATENT DOCUMENTS

| 7,672,910 B1 | 3/2010 | Kumar |
| 2003/0093393 A1* | 5/2003 | Mangasarian et al. .......... 706/16 |

OTHER PUBLICATIONS

Russenchuck, S. "Mathematical Optimization Techniques for the Design of Permanent Magnet Synchronous Machines Based on Numerical Field Calculation" IEEE Transactions on Magnetics, vol. 26, No. 2 Mar. 1990 pp. 638-641 (4 pages).*
Barbosa, Helio. Lemonge, Alfonso. "A new adaptive penalty scheme for genetic algorithms" Elsevier Inc, Jul. 25, 2003 pp. 215-251.*
Bayen, Alexander. "Lecture 11: Constrained Non-linear Optimization" Posted on Aug. 22, 2005. Downloaded on Mar. 1, 2010.*
Beidas, Bassem, George Papavassilopoulous "Distributed asynchronous algorithms with stochastic delays for constrained optimization problems with conditions of time drift" Parallel Computing 21 1995 p. 1431-1450. Downloaded on Mar. 1, 2010.*
Fourer, Robert. "Nonlinear Programming FAQ" Posted Dec. 1, 1997/ Downloaded on Mar. 1, 2010. http://www.ce.berkeley.edu/~bayen/ ce191www/lecturenotes/lecture11v01_constrained6.pdf.*
Mugele, Raymond. A nonlinear digital optimizing program for process control systems May 1-3, 1962 AFIPS Joint Computer Conferences pp. 15-32.Downloaded on Mar. 1, 2010.*
Wilson, Gregory.. "The History of the Development of Parallel Computing" Oct. 1994. Downloaded on Mar. 1, 2010. http://ei.cs.vt.edu/~ history/Parallel.html.*
Wright, Stephen and Dominique Orban. "Properties of the Log-Barrier Function on Degenerate Nonlinear Programs" Mathematics and COmputer Science Division Argonne National Laboratory, Mar. 20, 2002. Downloaded on Mar. 1, 2010.*
Lewis, Robert and Virginia Toezon. "A Globally Convergent Augmented Lagrangian Pattern Search Algorithm for Optimization with General Constraints and Simple Bounds" NASA Aug. 1998. [Online] Downloaded Jun. 15, 2012 http://www.cs.odu.edu/~mln/ltrs-pdfs/ icase-1998-31.pdf.*
Russenchuck, S. "Mathematical Optimization Techniques for the Design of Permanent Magnet Synchronous Machines Based on Numerical Field Calculation" IEEE Transactions on Magnetics, vol. 26, No. 2 Mar. 1990 p. 638-641 (4 pages).

(Continued)

*Primary Examiner* — Ben Rifkin
(74) *Attorney, Agent, or Firm* — Harrity & Harrity, LLP

(57) ABSTRACT

An Augmented Lagrangian Pattern Search (ALPS) algorithm that attempts to solve a non-linear optimization problem subject to non-linear, linear, and, bound constraints is discussed. The present invention utilizes information from the linear and bound constraints, formulates sub-problems using Lagrange parameter estimates and appropriate penalty parameters (using a log barrier), and provides a robust update formulae for parameters which guides the algorithm towards a minimum. The present invention solves a general non-linear optimization problem without using any slack variables to convert the inequality constraints to equality constraints or equality constraints to inequality constraints.

19 Claims, 4 Drawing Sheets

OTHER PUBLICATIONS

Barbosa, Helio. Lemonge, Alfonso. "A new adaptive penalty scheme for genetic algorithms" Elsevier Inc, Jul. 25, 2003 p. 215-251.

U.S. Appl. No. 11/302,743, Kumar, Rakesh, "System and Method for Performing Non-Linear Constrained Optimization with an Augmented Lagrangian Pattern Search" Dec. 13, 2005, 14 Pages.

Cheng et al. "Unit Commitment by Lagrangian Relaxation and Genetic Algorithms". 2000, IEEE Transactions on Power Systems, vol. 15, No. 2. May 2000. pp. 707-714.

Michalewicz et al. "GENOCOP: A Genetic Algorithm for Numerical Optimization Problems with Linear Constraints". 1996, ACM.vol. 39 Issues 12es, Dec. 1996. pp. 1-26.

* cited by examiner

SYSTEM AND METHOD FOR PERFORMING NON-LINEAR CONSTRAINED OPTIMIZATION WITH AN AUGMENTED LAGRANGIAN PATTERN SEARCH

RELATED APPLICATIONS

This application is a continuation of U.S. application Ser. No. 11/302,743, filed Dec. 13, 2005, which is related to a pending United States application entitled "System and Method for Performing Non-Linear Constrained Optimization With a Genetic Algorithm" filed Dec. 12, 2005, application Ser. No. 11/301,155, the disclosures of which are incorporated herein by reference.

FIELD OF THE INVENTION

The illustrative embodiment of the present invention relates generally to constrained optimization problems, and more particularly to the use of an augmented Lagrangian pattern search that is used to solve optimization problems that include non-linear constraints.

BACKGROUND

Constrained non-linear optimization problems are composed of a non-linear objective function and may be subject to linear, bound and non-linear constraints. The constrained non-linear optimization problem to be solved may be represented as Minimize f(x)
x
Such that $C_i(x) \leq 0, i=1 \ldots m$ $C_i(x)=0, i=m+1 \ldots mt$ $Ax \leq b$ $A_{eq}x=b_{eq}$ $LB \leq x \leq UB$     (A)

where, $C_i(x)$ is non-linear inequality and equality constraint. The integer "m" is the number of non-linear inequality constraints, and "mt" is the total number of non-linear constraints. $Ax \leq b$ and $A_{eq}x=b_{eq}$ are linear constraints, LB and UB are lower and upper bounds on the decision variable x.

There are a number of conventional approaches which have been utilized to attempt to solve the constrained non-linear optimization problem, each of which suffers from a number of drawbacks. The most popular approach to perform optimization subject to the non-linear constraints is to formulate a sub-problem with a penalty parameter, and then solve the sub-problem. The sub-problem formulated from the original problem (A) is shown below:

$$\Theta(x,\rho) = f(x) - \rho \left( \sum_{i=1}^{m} \max(0, Ax - b) + \sum_{i=m+1}^{mt} |A_{eq}x - b_{eq}| + \sum_{i=1}^{m} \max(0, c_i(x)) + \sum_{i=m+1}^{mt} |c_i(x)| \right)$$

This sub-problem is solved using a fixed value for the penalty 'ρ', or by making ρ dependent on the iteration number. The non-linear constraints are included in the sub-problem formulation. Some implementations have included linear constraints in the sub-problem as well. The sub-problem is minimized subject to bound constraints only. The solution to the sub-problem is difficult in that it requires the user to choose the right value of ρ for different problems. If the linear constraints are used in the sub-problem, then the problem becomes more difficult to solve.

A filter-based approach is primarily used in multi-objective optimization but some researchers have applied the same technique to handle the non-linear constraints in a constrained optimization problem. The approach uses a pattern search method for general constrained optimization based on the filter method for the step acceptance. Essentially, a filter method accepts a step that either improves the objective function value or the value of some function that measures the constraint violation. This algorithm can be used for the optimization problems with non-linear inequality constraints only, as shown in (B) below Minimize f(x)
x
Such that $C_i(x)=1 \ldots m$ $Ax \leq b$ $A_{eq}x=b_{eq}$ $LB \leq x \leq UB$     (B)

Unfortunately, this algorithm lacks a convergence theory for the direct search class of algorithms. The lack of convergence theory may prevent the solution from satisfying the Karush Kuhn Tucker (KKT) condition of optimality, an essential condition for constrained optimization. The solution obtained by using this algorithm may not be guaranteed to be a minimum to the original problem A. Also, it is not efficient for problems with the large number of non-linear constraints.

An additional approach uses an augmented Lagrangian formulation of a non-linearly constrained optimization. This approach can be used for optimization problems with non-linear equality and bound constraints only, as shown in (C) below:

Minimize f(x)
x
Such that $C_i(x)=0, i=1 \ldots mt$ $LB \leq x \leq UB$     (C)

The key drawback of this algorithm is that it treats the linear constraints as non-linear making it inefficient in handling large number of constraints. It also uses a slack variable (which is a variable that is introduced when inequality constraints are replaced by equalities) to convert each inequality constraint to an equality constraint. The use of slack variables causes an increase of the problem size.

Thus, the penalty approach requires the difficult selection of an appropriate penalty parameter, the filter search is used with non-linear inequality constraints only and does not scale well, and the augmented Lagrangian formulation approach treats linear and non-linear constraints the same and relies on slack variables which come with an overhead price.

BRIEF SUMMARY

Pattern search is a class of optimization algorithms that does not require any derivative information to find an optimal point. A pattern search algorithm builds a pattern of points around the current point along a set of positive basis vectors. The illustrative embodiment of the present invention provides an Augmented Lagrangian Pattern Search (ALPS) algorithm and attempts to solve a non-linear optimization problem subject to non-linear, linear, and, bound constraints. The illustrative embodiment separates non-linear constraints from bound and linear counterparts, utilizes information from the linear and bound constraints, formulates sub-problems with appropriate penalty terms (using a log barrier), and provides a robust update formulae which guides the algorithm towards a minimum. The present invention solves a general non-linear optimization problem of the form (A) discussed above and does not use any slack variables to convert the inequality constraints to equality constraints or equality constraints to inequality constraints.

In one aspect of the present invention in a computing device, a method of performing constrained optimization includes the step of providing an optimization problem that includes non-linear constraints, linear constraints and bound constraints. The method formulates a sub-problem that is an approximation of the original optimization problem. The sub-problem excludes the linear and bound constraints and includes the non-linear constraints. The sub-problem includes a penalty parameter and at least one Lagrange parameter estimate. The method solves the sub-problem using a pattern search and generates a solution to the optimization problem using the solution to the sub-problem. Additionally the method stores the solution to the optimization problem in a location accessible from the computing device.

In another aspect of the present invention, a computing apparatus includes a pattern search algorithm that formulates a sub-problem from an optimization problem that includes non-linear constraints, linear constraints and bound constraints. The sub-problem includes the non-linear constraints and excludes the linear and bound constraints. The pattern search algorithm solves the sub-problem while satisfying the linear and bound constraints using at least one Lagrangian parameter estimate and a penalty parameter. The computing apparatus also includes a storage location for storing the solution.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention uses an augmented Lagrangian pattern search algorithm to perform constrained optimization for optimization problems that include linear constraints, bound constraints and non-linear constraints. The illustrative embodiment separates the non-linear constraints from the linear and bound constraints and handles each separately. The present invention also utilizes information from the linear and bound constraints and formulates a sub-problem with appropriate penalty terms (using a log barrier) and Lagrange parameter estimates that include the non-linear constraints and excludes the linear and bound constraints. The illustrative embodiment also includes update formulae which guides the algorithm towards a minimum.

Figure 1:
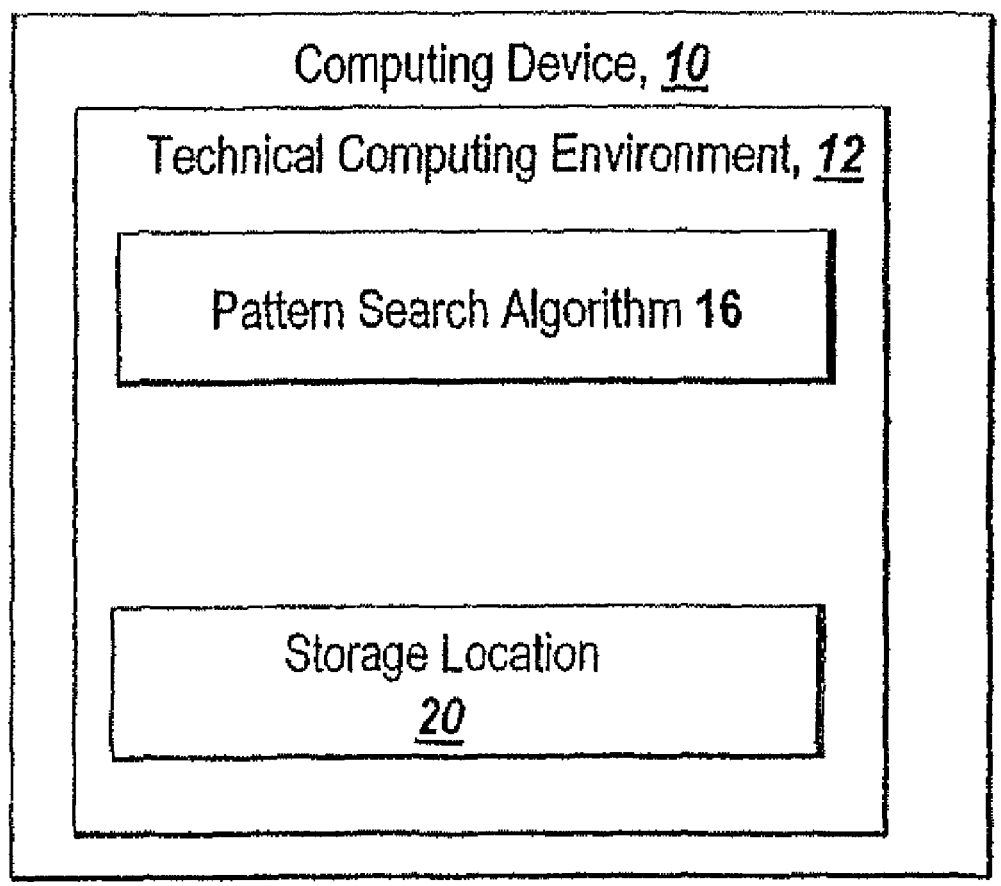
FIG. 1 depicts an environment suitable for practicing the illustrative embodiment of the present invention.

FIG. 1 depicts an environment suitable for practicing the illustrative embodiment of the present invention. A computing device 10 hosts a technical computing environment 12. The computing device 10 may be a PC, workstation, server, laptop, mainframe, PDA or other computing device equipped with a processor and capable of hosting the technical computing environment 12. The computing device 10 may be equipped with a single processor, a multi-core processor, or multiple processors. The processor may be a 32 bit processor, 64 bit processor or some other type of processor capable of executing the instructions required for the present invention. The technical computing environment 12 may be any technical computing environment used to process constrained optimization problems. An exemplary technical computing environment is MATLAB from The MathWorks, Inc. of Natick, Mass.

The technical computing environment 12 includes an augmented Lagrangian pattern search algorithm 16 of the present invention. Those skilled in the art will appreciate that the augmented Lagrangian pattern search algorithm 16 may be practiced in other applications and environments in addition to the technical computing environment 12. The Lagrangian pattern search algorithm 16 separately handles the non-linear constraints by formulating a sub-problem with an appropriate penalty factor and Lagrangian estimate parameters. The formulation of the sub-problem is discussed in detail below. The computing device 10 also includes storage 20 that may be used to save results of the optimization problem that are generated using the augmented Lagrangian pattern search algorithm 16 of the present invention.

It will be appreciated by those skilled in the art that in alternate implementations, the augmented Lagrangian pattern search algorithm 16 may run in a virtualized environment such as in a virtual machine. Multiple virtual machines running the code may be resident on a single processor. Also, hardware acceleration may be used and all or a portion of the code may run on a FPGA or an ASIC.

Figure 2:
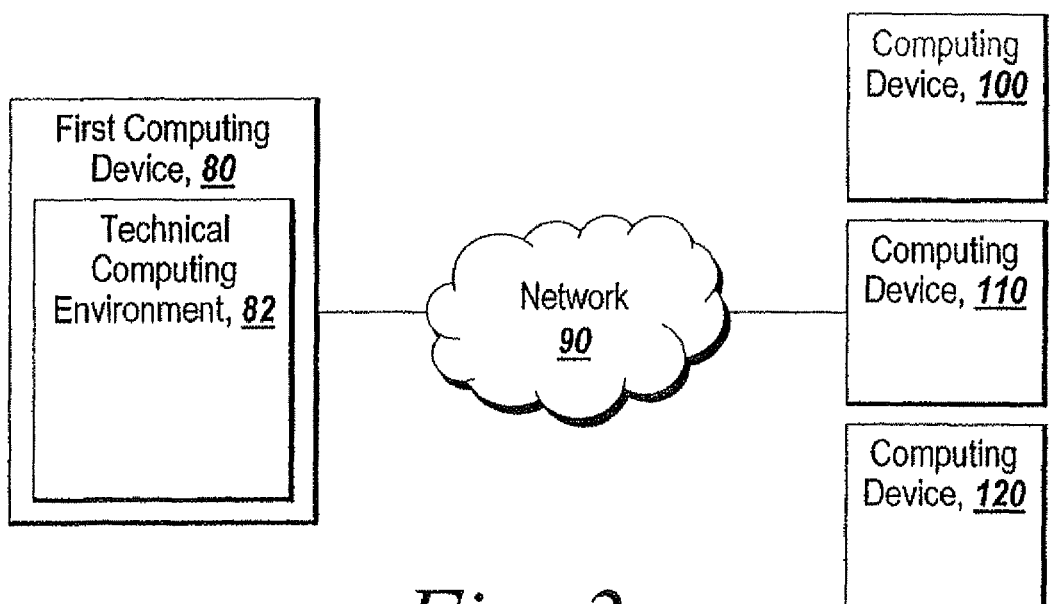
FIG. 2 depicts an alternate distributed environment suitable for practicing the illustrative embodiment of the present invention.

The illustrative embodiment of the present invention may also be practiced in a distributed or parallel environment. For example, FIG. 2 depicts an alternate distributed environment suitable for practicing the illustrative embodiment of the present invention. A first computing device 80 that includes a technical computing environment 82 communicates over a network 90 with multiple computing devices 100, 110, and 120. The network 90 may be a Wide Area Network (WAN), Local Area Network (LAN), the Internet, an intranet or some other type of network over which the multiple computing devices 100, 110 and 120 can communicate with the first computing device 80. The augmented Lagrangian pattern search algorithm 66 formulates a sub-problem that includes the non-linear constraints of the optimization problem. The formulated sub-problem is then transmitted over the network 90 to the multiple computing devices 100, 110 and 120. The multiple computing devices 100, 110 and 120 may then each attempt to solve the sub-problem in parallel. Other distributed and parallel architectures including thin-client and server-based computing architectures for practicing the present invention will be apparent to those skilled in the art. Similarly, it will be appreciated that various components discussed herein may be virtualized without departing from the scope of the present invention.

The Augmented Lagrangian Pattern Search (ALPS) algorithm 16 attempts to solve a non-linear optimization problem subject to the non-linear, linear, and, bound constraints. As noted above, the bound and linear constraints are handled separately from the non-linear constraints. A sub-problem is formulated by combining the objective function and the non-linear constraint function using the Lagrangian and the penalty parameters. A sequence of such optimization problems are minimized using the pattern search algorithm 16 such that the linear and bounds constraints are satisfied.

A sub-problem is formulated as;

$$\Theta(x, \lambda, s, \rho) = f(x) - \sum_{i=1}^{m} \lambda_i s_i \log(s_i - c_i(x)) + \sum_{i=m+1}^{mt} \lambda_i c_i(x) + \frac{\rho}{2} \sum_{i=m+1}^{mt} c_i(x)^2$$

where the components $\lambda_i$ of the vector $\lambda$ are nonnegative and are known as the Lagrange multiplier estimates. The elements $s_i$ of the vector s are nonnegative shifts, and $\rho$ is the positive penalty parameter. The algorithm begins by using an initial value for the penalty parameter.

A pattern search minimizes a sequence of the sub-problem, which is an approximation to the original problem (A). When the sub-problem is minimized to a required accuracy, and the solution satisfies the feasibility conditions, the Lagrange parameter estimates are updated. Otherwise, the penalty parameter is multiplied by the penalty factor. This results in a new sub-problem formulation and a new minimization problem. These steps are repeated until one or more stopping criteria are met. The penalty and Lagrange parameters update formulae are based on the well known algorithms in the continuous optimization theory.

Figure 3:
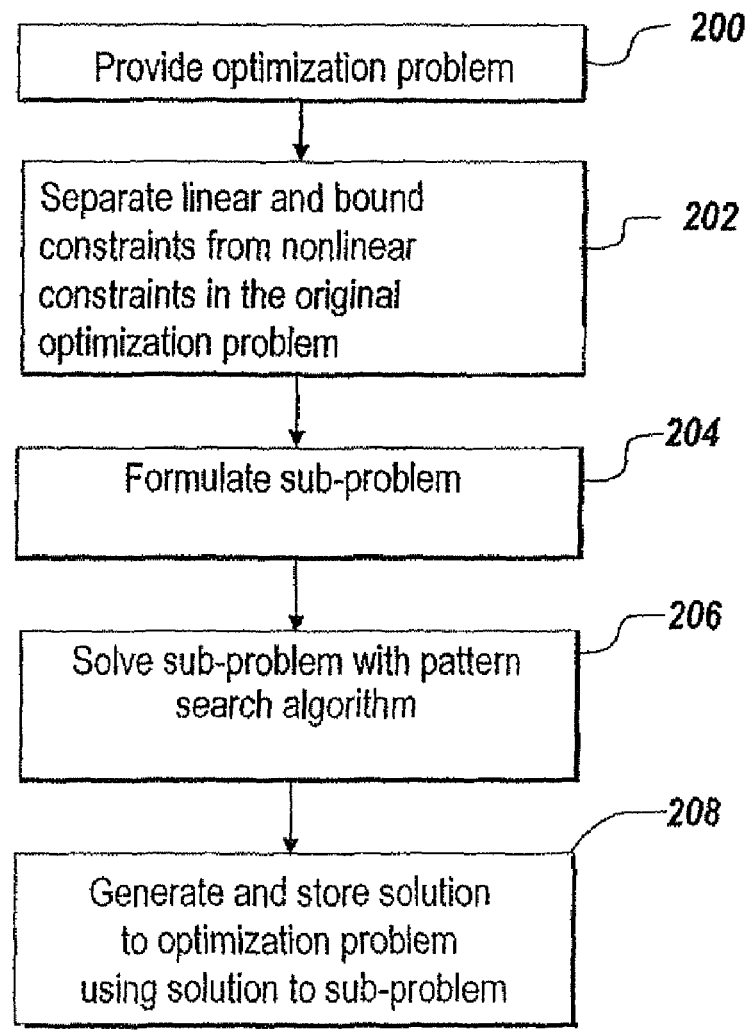
FIG. 3 is a flowchart of the sequence of steps followed by the illustrative embodiment of the present invention to solve constrained non-linear optimization problems.

The overall sequence of steps followed by the illustrative embodiment of the present invention is depicted in the flowchart of FIG. 3. The sequence begins with the providing of an optimization problem (step 200). The linear and bound constraints are then separated from non-linear constraints (step 202). A sub-problem is then formulated (step 204) and solved with the pattern search algorithm (step 206). The solution to the optimization problem is then generated and stored using the solution to the sub-problem (step 208).

Figure 4:
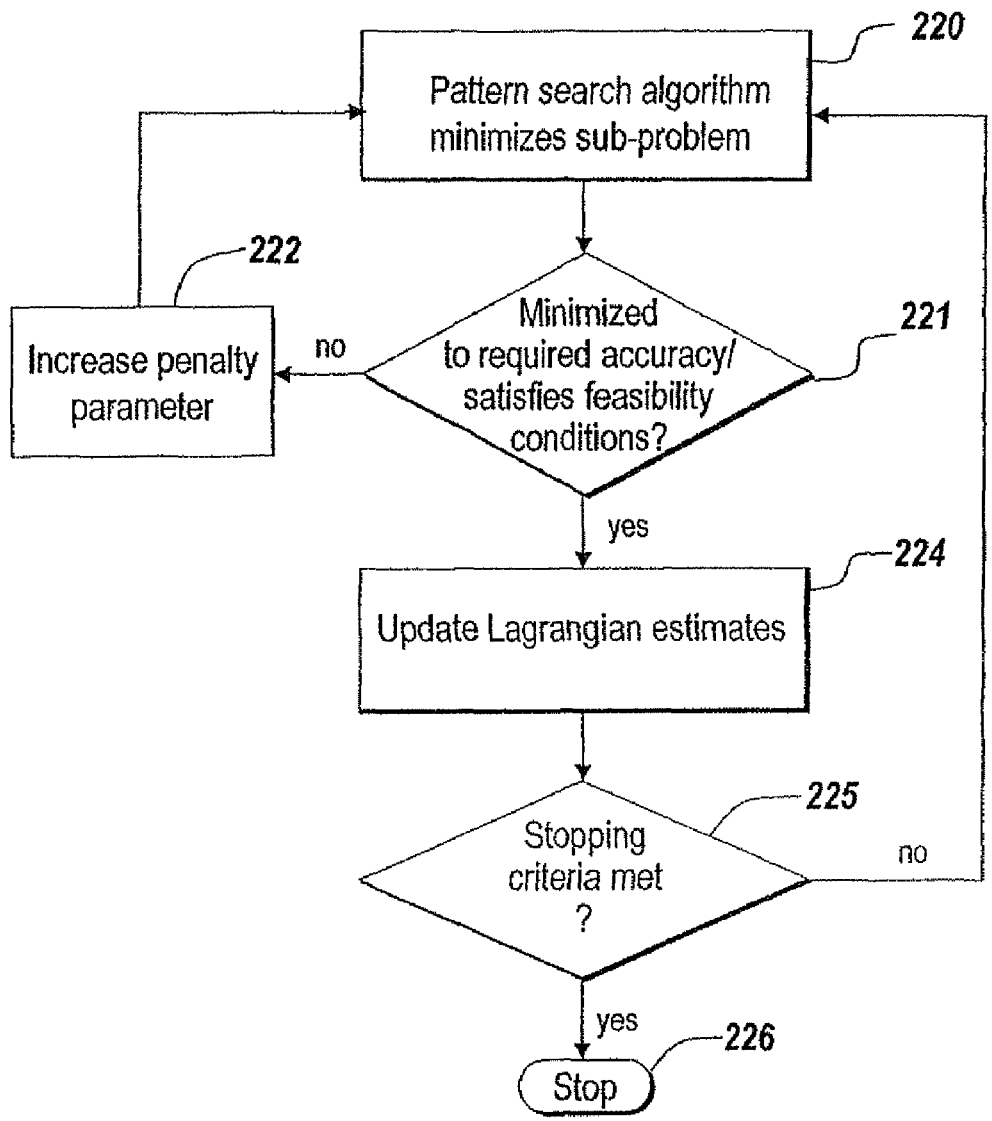
FIG. 4 is a flowchart of the sequence of steps followed by the illustrative embodiment of the present invention to solve a sub-problem for the constrained optimization of FIG. 3.

The use of the pattern search algorithm is depicted in greater detail in the flowchart of FIG. 4. The sequence begins when the Augmented Lagrangian pattern search algorithm 16 minimizes the sub-problem (step 220). The sub-problem is checked to see if it has been minimized to a required accuracy and satisfies feasibility conditions (step 221). If it has/does not, the penalty parameter is increased (step 222) which results in a new sub-problem which is then minimized again (step 220). If the minimization does satisfy the accuracy and feasibility requirements (step 221), the Lagrangian estimates are updated (step 224). If one or more stopping criteria are met (step 225), the sequence ends (step 226). If no stopping criteria is met, the process iterates and the Augmented Lagrangian Pattern Search algorithm 16 minimizes the new sub-problem again with new Lagrange and penalty parameters.

As noted above, the Augmented Lagrangian Pattern Search Algorithm accounts for linear constraints and bound constraints. The Augmented Lagrangian Pattern Search algorithm uses a set of direction vectors that form a positive basis in $R^n$ which is sufficient to guarantee a decrease in function value with appropriate step size. Ordinarily in an unconstrained optimization problem, it is possible to take a finite non-zero step along all the direction vectors and at least one of the direction vectors will decrease the function value. However, in presence of linear constraints or bounds, a positive basis set of direction vectors may not be sufficient. This is especially true when the current point is near or on a constraint boundary. The directions may form a positive basis set without any of them being a feasible directions. The set of direction vectors must be augmented by tangent vectors to the active constraints. The augmented pattern search algorithm identifies the active set of linear and bound constraints and adds direction vectors which form a tangent cone to the active set. This will ensure that for some finite step size at least one search direction will be feasible with respect to linear and bound constraints.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A computer-implemented method comprising:
providing a single function optimization problem that is subject to non-linear constraints, linear constraints, and bound constraints;
formulating, using an augmented Lagrangian pattern search algorithm, a sub-problem, from the single function optimization problem, which excludes the linear constraints and the bound constraints, and includes the non-linear constraints, the sub-problem including a penalty parameter and at least one Lagrangian parameter estimate;
solving the sub-problem using the augmented Lagrangian pattern search algorithm while satisfying the linear constraints and the bound constraints, the sub-problem being solved in parallel using a plurality of computing devices,
solving the sub-problem comprising:
multiplying the penalty parameter, included in the sub-problem, by a penalty factor when a solution, to the sub-problem, is not minimized to a pre-determined accuracy or when the solution to the sub-problem does not satisfy a feasibility condition;
generating a solution to the single function optimization problem using the solution to the sub-problem; and
storing the solution to the single function optimization problem in a storage location accessible to a computing device.

2. The method of claim 1, where the solving of the sub-problem further comprises:

minimizing, using the augmented Lagrangian pattern search algorithm, a sequence of the sub-problem to the solution; and determining, using the augmented Lagrangian pattern search algorithm, whether the solution to the minimized sequence of the sub-problem is minimized to the pre-determined accuracy and whether the solution to the sub-problem satisfies the feasibility condition.

3. The method of claim 2, further comprising:

adjusting, when the solution to the sub-problem is minimized to the pre-determined accuracy and when the solution to the sub-problem satisfies a feasibility condition, the at least one Lagrangian parameter estimate.

4. The method of claim 3, further comprising:

repeating until a stopping criteria is achieved:
the minimizing a sequence of the sub-problem to a solution,
the determining whether the solution to the sub-problem is minimized to a pre-determined accuracy and whether the solution to the sub-problem satisfies a feasibility condition, and
the adjusting, when the solution to the sub-problem is minimized to a pre-determined accuracy and when the solution to the sub-problem satisfies a feasibility condition, the at least one Lagrangian parameter estimate.

5. The method of claim 1, where the single function optimization problem is solved in a technical computing environment.

6. The method of claim 1, where the non-linear constraints comprise non-linear inequality and equality constraints and the bound constraints comprise lower and upper bound constraints, and
where formulating the sub-problem comprises excluding the linear constraints and the lower and upper bound constraints, and including the non-linear inequality and equality constraints.

7. A computing device, comprising:

at least one processor to:
execute an augmented Lagrangian pattern search algorithm that formulates a sub-problem, from a single function optimization problem that is subject to non-linear constraints, linear constraints, and bound constraints, the sub-problem including the non-linear constraints and excluding the linear constraints and the bound constraints,
solve the sub-problem using the augmented Lagrangian pattern search algorithm while satisfying the linear constraints and the bound constraints, the sub-problem including at least one Lagrangian parameter estimate and a penalty parameter,
when solving the sub-problem, the at least one processor is to:
multiply the penalty parameter, included in the sub-problem, by a penalty factor when a solution, to the sub-problem, is not minimized to a pre-determined accuracy or when the solution to the sub-problem does not satisfy a feasibility condition,
generate a solution to the single function optimization problem using the solution to the sub-problem; and
a storage location to store the solution to the single function optimization problem.

8. The computing device of claim 7, where the at least one processor is further to use the augmented Lagrangian pattern search algorithm to determine whether the solution to the sub-problem is minimized to the pre-determined accuracy and whether the solution to the sub-problem satisfies the feasibility condition.

9. The computing device of claim 8, where the at least one processor, when the solution to the sub-problem is minimized to the pre-determined accuracy and when the solution to the sub-problem satisfies the feasibility condition, is to adjust the at least one Lagrangian parameter estimate.

10. The computing device of claim 8, where the sub-problem is solved in parallel using a plurality of processors located on a plurality of computing devices.

11. The computing device of claim 10, where the at least one processor is further to transmit the sub-problem, over a network, to the plurality of computing devices.

12. The computing device of claim 8, where the single function optimization problem is solved in a technical computing environment.

13. The computing device of claim 7, where the at least one processor is to use the augmented Lagrangian pattern search algorithm to identify an active set of linear and bound constraints and add direction vectors, to ensure that at least one search direction is feasible with respect to the linear constraints and the bound constraints.

14. A non-transitory computer-readable medium storing instructions, the instructions comprising:

one or more instructions which, when executed by a processor, cause the processor to provide
a single function optimization problem that is subject to non-linear constraints, linear constraints, and bound constraints;
one or more instructions which, when executed by the processor, cause the processor to formulate, using an augmented Lagrangian pattern search algorithm, a sub-problem, from the single function optimization problem, which excludes the linear constraints and the bound constraints, and includes the non-linear constraints, the sub-problem including a penalty parameter and at least one Lagrangian parameter estimate;
one or more instructions which, when executed by the processor, cause the processor to solve
the sub-problem using the augmented Lagrangian pattern search algorithm while satisfying the linear constraints and the bound constraints, the sub-problem being solved in parallel using a plurality of computing devices,
the one or more instructions to solve the sub-problem comprising:
one or more instructions to multiply the penalty parameter, included in the sub-problem, by a penalty factor when a solution, to the sub-problem, is not minimized to a pre-determined accuracy or when the solution to the sub-problem does not satisfy a feasibility condition;
one or more instructions which, when executed by the processor, cause the processor to generate a solution to the single function optimization problem using the solution to the sub-problem; and
one or more instructions which, when executed by the processor, cause the processor to store
the solution to the single function optimization problem in a storage location accessible from at least one of the plurality of computing devices.

15. The non-transitory computer-readable medium of claim 14, where the one or more instructions to solve the sub-problem further comprise:

one or more instructions to minimize, using the augmented Lagrangian pattern search algorithm, a sequence of the sub-problem to the solution; and one or more instructions to determine, using the augmented Lagrangian pattern search algorithm, whether the solution to the sub-problem is minimized to the pre-determined accuracy and whether the solution to the sub-problem satisfies the feasibility condition.

16. The non-transitory computer-readable medium of claim 15, where the instructions further comprise:
one or more instructions to adjust when the solution to the sub-problem is minimized to the pre-determined accuracy and when the solution to the sub-problem satisfies the feasibility condition, the at least one Lagrangian parameter estimate.

17. The non-transitory computer-readable medium of claim 16, further comprising:
one or more instructions to repeat until a stopping criteria is achieved:
the minimization of a sequence of the sub-problem to a solution;
the determination of whether the solution to the sub-problem is minimized to a pre-determined accuracy and whether the solution to the sub-problem satisfies a feasibility condition; and
the adjustment, when the solution to the sub-problem is minimized to a pre-determined accuracy and when the solution to the sub-problem satisfies a feasibility condition, of the at least one Lagrangian parameter estimate.

18. The non-transitory computer-readable medium of claim 14, where the single function optimization problem is solved in a technical computing environment.

19. The non-transitory computer-readable medium of claim 14, where the one or more instructions to formulate the sub-problem comprise one or more instructions to formulate the sub-problem including the penalty parameter, using a log barrier.

* * * * *